March 12, 1968 K. LEVY 3,373,423
LOW-LEVEL FLIGHT SYSTEM
Filed May 26, 1965 3 Sheets-Sheet 1

INVENTOR.
KURT LEVY
BY

March 12, 1968     K. LEVY     3,373,423
LOW-LEVEL FLIGHT SYSTEM
Filed May 26, 1965     3 Sheets-Sheet 3

INVENTOR
KURT LEVY
BY
ATTORNEY

United States Patent Office 3,373,423
Patented Mar. 12, 1968

3,373,423
LOW-LEVEL FLIGHT SYSTEM
Kurt Levy, Vestal, N.Y., assignor to General Precision Systems Inc., a corporation of Delaware
Filed May 26, 1965, Ser. No. 458,904
9 Claims. (Cl. 343—5)

This invention relates to a low-level flight system and more particularly to a novel low-level flight system for use in operational aircraft.

Prior art low-level flight systems are exemplified by well-known radar terrain avoidance systems employed in present-day, high-performance military aircraft. Such aircraft must incorporate the capability of flying attack missions over enemy territory at low levels in order to avoid detection by enemy ground based radar. Flight at low level results in the aircraft being effectively masked by normal ground clutter and the actual terrain elevational contours. However, in order to fly such missions, a sophisticated radar terrain avoidance system is mandatory in order to convey to the pilot the rapidly-changing terrain elevation data, and generally, the pilot normally "flies" the aircraft only from the data presented on the radar display. However, since such radar systems are generally restricted to a line-of-sight of about 20 to 25 miles, the pilot's radar display presents only the terrain elevation features to be overflown during the next one or two minutes of flight, thereby requiring maximum concentration by the pilot on the display. The problem is further complicated by the fact that low-level radar data is difficult to interpret due to odd angle of incidence and variation-of-reflectance characteristics.

Such radar terrain avoidance systems suffer from another major disadvantage in that, although the possibility of detection of the aircraft flying a low-level profile by ground based radar is minimized, the aircraft remains vulnerable to detection as a result of the electromagnetic energy continuously radiated by the active radar terrain avoidance system.

The present invention overcomes each of the above difficulties by providing a novel low-level flight system which is essentially passive in nature, that is, it requires no electromagnetic radiation from the aircraft in order to present to the pilot the necessary terrain elevational data, and is capable of presenting this data throughout an extended range of up to 200 miles, all while reducing the pilot's interpretation time. Briefly, the invention contemplates the pre-storage within the aircraft of elevation information relating to the area to be flown over by the aircraft during the low-level attack mission, portions of the information being selectively retrieved and displayed to the pilot under control of the on-board inertial navigation system. The terrain elevation information so retrieved is then converted into a video signal and in one embodiment is displayed as a radar presentation on the viewing screen. In a related embodiment of the invention the video signal is employed to present to the pilot a true visual three-dimensional perspective display of the terrain, it being understood that both types of displays may be employed simultaneously. Additionally, the accuracy of the low-level flight system of the invention may be periodically checked, and should an error greater than a specified number of feet in altitude be found to exist, the conventional radar terrain avoidance system is activated until the system of the invention is once again within tolerance, or a radar altimeter with automatic correction may be periodically employed.

It is an object of the invention, therefore, to provide a low-level flight system.

Another object of the invention is to provide a novel low-level flight system for use in operational aircraft.

Yet another object of the invention is to provide an essentially passive low-level flight system.

A further object of the invention is to provide an operational aircraft with a low-level flight system including the pre-storage of elevation information relating to the area to be flown over by the aircraft, portions of the pre-stored information being retrieved and displayed to the pilot in accordance with the aircraft's actual position.

Still another object of the invention is to provide an essentially passive low-level flight system operable to display to the pilot terrain elevational features in radar form.

Yet another object of the invention is to provide an essentially passive low-level flight system operable to display to the pilot terrain elevational features in three-dimensional perspective form.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawings, in which.

Although the invention will now be described in conjunction with high-performance military aircraft, the invention has a number of further uses such as a supplement to GCA landings of commercial aircraft and the like, some of which will be hereinafter briefly described and some of which will be obvious.

Figure 1:
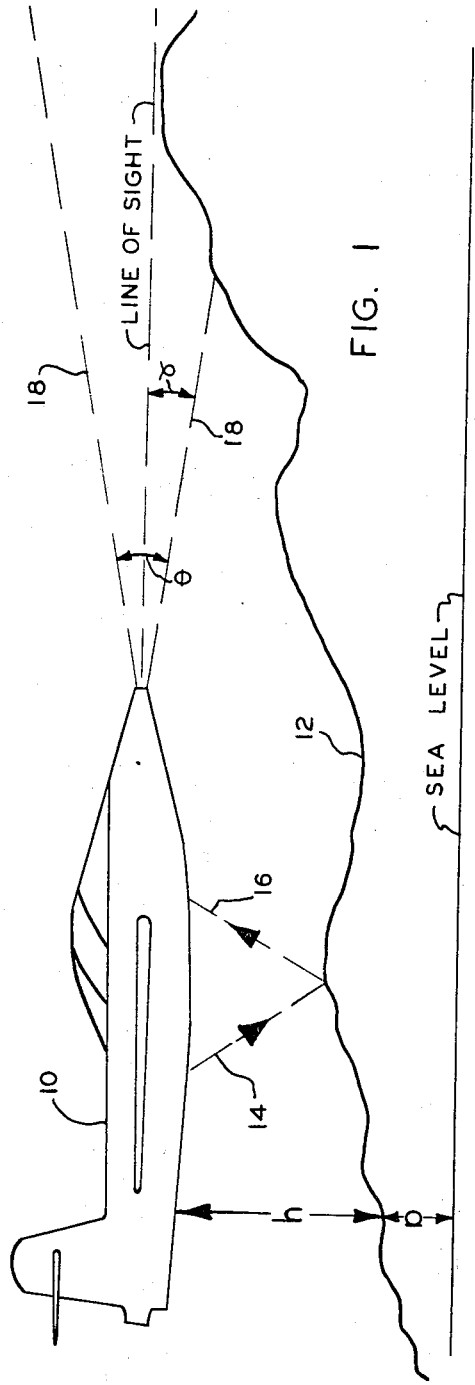
FIG. 1 illustrates an aircraft flying a low-level mission.

Referring now to the drawings, FIG. 1 illustrates an aircraft flying a low-level mission. As there shown an aircraft 10 is flying at minimum altitude, $h$, above terrain 12, the terrain being at a further height, $a$, above sea level. Thus, the aircraft is positioned at an altitude $(h+a)$ above sea level. Normally, a sophisticated radar terrain avoidance system has been installed in aircraft 10 operable to scan a sector immediately forward of the aircraft, the sector being defined by an angle $\theta$. It may be seen from the pictorial illustration of FIG. 1 that the terrain elevation information that may be obtained is severely limited in range as a result of the aircraft's low altitude. Additionally, the aircraft is generally equipped with a radar altimeter which transmits a series of radio frequency pulses 14 and receives that portion of the beam reflected by the terrain, indicated as 16, the time interval between the transmission and reception of a pulse being calibrated in terms of altitude $h$. Alternatively, a Doppler radar altimeter or the like may be used. It is important to note, for reasons that will be readily apparent as the description proceeds, that independently of the type of radio altimeter employed, the radiated electromagnetic energy therefrom is confined within a narrow cone immediately beneath the aircraft. It may also be seen from FIG. 1 that the beam of electromagnetic energy 18—18 radiated by the aircraft's radar terrain avoidance system of necessity intercepts some or all of the terrain preceding the aircraft in order that the terrain features to be overflown by the pilot may be properly presented to the pilot on the radar display. For the reason that beam 18—18 must of necessity detect the surface of the terrain, ground radar receivers could be employed by the enemy to detect this beam and provide early warning of the approaching aircraft, even though ground-based radar systems are effectively nullified in their detection of the low flying aircraft as stated above.

Figure 2:
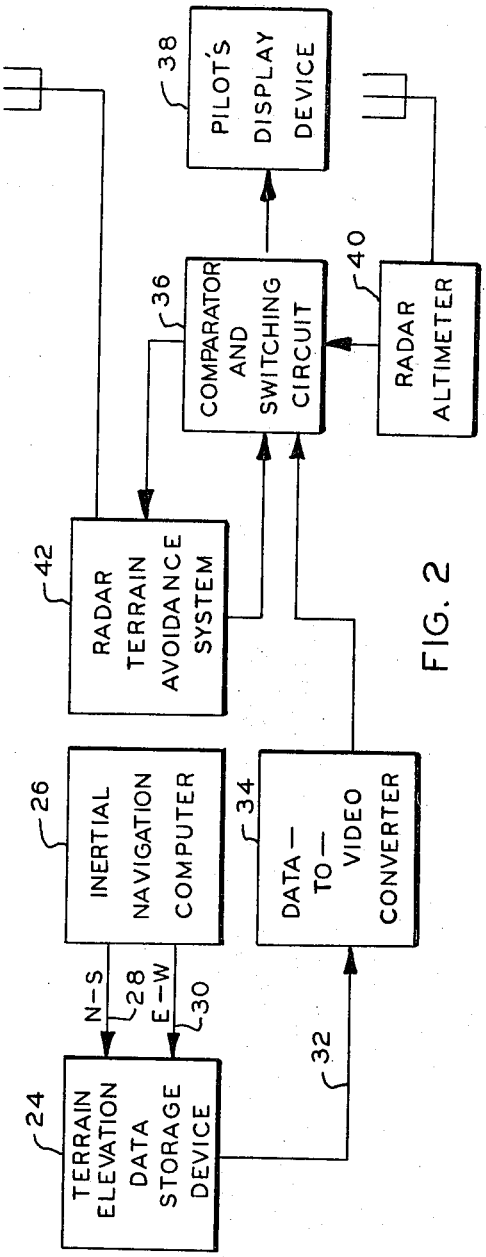
FIG. 2 is a simplified block diagram of a preferred embodiment of the low-level flight system of the invention.

There is illustrated in FIG. 2 a simplified block diagram of a preferred embodiment of the low-level flight system of the invention. As there shown, terrain elevation data corresponding to the elevational contours of the area over which the low-level profile mission is to be flown is prestored in a storage device 24, the terrain features immediately preceding the aircraft being selectively retrieved under control of the aircraft's inertial navigational computer 26. Since the inertial navigational computer forms no part of the present invention, it will not be further described herein, and reference therefor may be made to any of the standard radar textbooks. As indicated in FIG. 2, north-south and east-west coordinate data is transferred along lines 28 and 30, respectively, from computer 26 to storage device 24 to control data retrieval. In accordance with the X–Y coordinate information supplied thereto, storage device 24 provides elevation data in either analog or digital form respecting the terrain directly in the flight path of the aircraft. Such elevation data is retrieved from storage by data-to-video converter 34. Converter 34 is effective, in one preferred embodiment of the invention, to change the retrieved data into a conventional radar display video signal, and in another preferred embodiment to change such data into video which thereafter may be employed to provide the pilot with an extended range, three-dimensional perspective view of the approaching terrain. As well as the X–Y geographical position information made available from inertial navigation computer 26, operation of the invention also requires aircraft attitude or Euler angle input data, such as bank angle, pitch angle and heading. It will be understood that such attitude information is conventionally available in almost all aircraft.

The video signal containing the necessary terrain elevational information is coupled to a comparator and switching circuit 36 and normally is directly fed to a pilot's display device 38. In order to increase the pilot's confidence in the low-level flight system of the invention, the aircraft's radar altimeter 40 may periodically be activated, either manually or under automatic control. The aircraft's altitude above the terrain as determined by the altimeter is then delivered to comparator 36 where its magnitude is compared with the instantaneous altitude obtained from storage device 24. Should an error greater than a predetermined number of feet be indicated, the conventional radar terrain avoidance system 42 is activated until the error between the pre-stored and measured altitudes is again within the predetermined number of feet. Unit 36 under these conditions operates to block the video signal from converter 34 and apply the video signal from radar system 42 to display device 38. In this manner, if for any reason the pre-stored data is in error, safety of the flight is ensured since, although the possibility of detection of the low flying aircraft is increased, conventional terrain avoidance techniques may be rapidly substituted. It thus may be seen that the system provides an essentially passive terrain avoidance system, the only active system normally necessary being an altimeter whose beam of radiated electromagnetic energy is confined to a narrow cone immediately beneath the aircraft.

Although several storage and retrieval systems will hereinafter be briefly described, it is preferred that the elevational data be stored on a photographic transparency, the position of which is controlled by the output of inertial navigation computer 26, the data being retrieved by means of a flying-spot-scanner (FSS) and an associated photomultiplier. Essentially similar systems are disclosed in U.S. Patent Nos. 3,031,774, 3,113,989, 3,067,526 and 3,100,238 directed to radar simulator systems all of which have been assigned to the assignee of this invention. Generally stated, such radar simulator systems employ one or more photographic transparencies, at least one of which includes elevation information encoded in gray scale variations. The transparencies are positioned by servo motors, driven from inputs corresponding to the position of the simulated aircraft. Additionally, a flying-spot-scanner views the transparencies, the resultant modulated light beams being detected by photo-multipliers to provide a video signal to the final radar display device. The present invention utilizes a modification of such systems for navigating the operational aircraft, and is particularly effective when such an aircraft is flying at extremely low altitudes.

Figure 3:
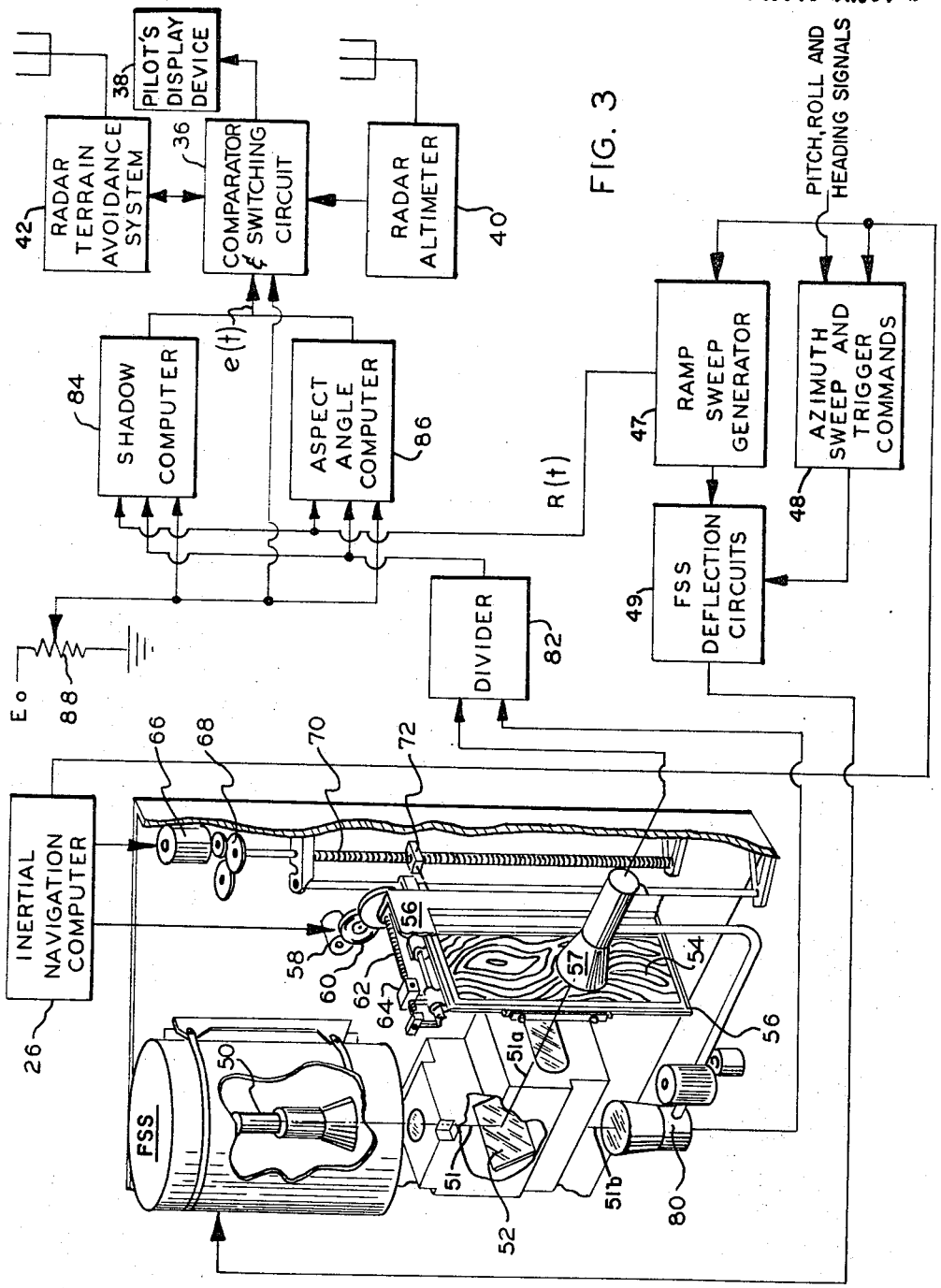
FIG. 3 is a further block diagram of the preferred embodiment of the invention illustrated in FIG. 2.

Referring again now to the drawings, FIG. 3 illustrates a preferred embodiment of the invention employing a photographic transparency to store elevation data in block diagram form. As there shown flying-spot scanner 50 projects a scanning light beam 51 towards a beam-splitter or half-silvered mirror 52. The direction and distance which the scanning beam scans may be controlled by the flying-spot scanner deflection circuits 49 in the same manner in which similar flying-spot scanners are controlled in the radar simulation patents referred to above, with a basic sweep waveform being generated by sweep generator 47, and with the sweep azimuth and triggering being determined by the aircraft Euler angle data shown symbolically as being applied to circuit 48. An aircraft heading input, for example, may be used to position the deflection yoke on scanner 50 in order that the scanner 50 in order that the scanner scan map 54 in a direction corresponding to instantaneous actual aircraft heading. Beam-splitter 52 directs a portion 51a of beam 51 onto and through a photographic film plate 54. Plate 54 comprises a transparency encoded with elevational contours representing the area in which the aircraft is being flown. The light beam modulated by the gray scale variations on plate 54 is converted to an electrical signal by a photomultiplier 57. The remaining portion of light beam 51 is reflected to another photomultiplier 80, the operation of which will be explained below.

Elevation transparency 54 may be prepared by a successive stripping process wherein a contour map is photographed and the photographic emulsion is removed from selected areas between the contour lines of the map. The stripping process is alternated with further exposure of the map area upon diapositive transparencies and further contour elevational areas may be stripped away. If the areas of highest elevation are first stripped from a negative and first exposed on the positive film, the regions of high elevations will be comparatively dark while the regions of low elevations will be comparatively light. Thus transparency 54 contains the map information in various shades of gray representative of the contour information. This technique for preparing photographic prints is fully described in a bulletin entitled "Dyestrip Technique of Color Separation" published by the Aeronautical Chart and Information Center, Air Photographic and Charting Service (MATS).

Film plate 54 is mounted on a carriage 56 which is capable of two dimensional, or X–Y, movement. As the aircraft is flown, carriage 56 is moved by a pair of film plate drive servos under control of the inertial navigation system. As shown in FIG 3, the X–Y positioning mechanism includes a motor 58 coupled through a gear train 60 to a lead screw 62. As the lead screw rotates under control of a servomotor 58, a lead nut 64 is caused to move horizontally along the lead screw, thereby driving carriage 56 horizontally. The Y drive includes another servomotor 66 which is also coupled through a gear train 68 to rotate a further lead screw 70. As lead screw 70 rotates, a lead nut 72 is moved vertically therealong, and carriage 56 is likewise moved vertically. Thus the area of transparency 54 viewed by flying-spot scanner 50 corresponds exactly to the elevational information to be presented to the pilot, it being understood that the control signals coupled to servomotor 58 and 66 are provided by inertial navigational computer 26.

As is well known, the intensity of the spot of light provided by flying-spot scanner 50 generally varies considerably because of the non-uniformity of the phosphor layer thereon and because of variations of the response characteristics of various phosphors in the layer. For this reason a portion of the light is transmitted by beam-splitter 52 onto photomultiplier 80, which is positioned to continuously monitor the intensity of the transmitted portion 51b of light beam 51. The output of photomultiplier 80 is coupled to divider circuit 82. It may be seen that the electrical output of photomultiplier 57 is also applied to divider 82. Analog divider 82 corrects the video signal provided by photomultiplier 57 and provides an output video signal which is not dependent upon instantaneous intensity of the scanning spot and which is not subject to the variations thereof. The terrain elevation signal, $e(t)$, as corrected by divided 82 is then applied to a shadow computer 84 and an aspect angle computer 86 in parallel. Shadow computer 84 provides a selective blanking of the shadow area behind a terrain feature such as a mountain and the like. This computation is obtained by means of conventional wide-band operational amplifiers employing logarithmic feedback networks. In this manner, the shadow computer detects whenever the viewing angle available to the pilot goes through a maximum, that is, when the slope of the viewing angle changes from a maximum value to a previously measured value. Shadow blanking begins when this maximum angle is detected, and ends when the value of the viewing angle again returns to and exceeds the value obtained at the beginning of shadow blanking in order that the radar display may be entirely realistic. Generally the maximum angle is detected by a voltage comparator which receives each of two input signals, the first being proportional to the instantaneous value of the viewing angle as the angle increases from the nadir to the line of sight of the aircraft, the second being the previous maximum value of the angle. Additionally, shadow computer 84 is provided with a further input signal commensurate with the height of the aircraft above sea level $(h+a)$, provided by potentiometer 88, as well as the instantaneous radar range function provided by the ramp sweep generator 47. More complete details of such a shadow computer may better be understood from a study of the apparatus described and claimed in the above referenced U.S. Patent No. 3,067,526.

Aspect angle computer 86 is effective to rapidly modify the video signal in accordance with the computed cosine function of the angle of incidence between incremental areas of the stored terrain data and the viewing angle of the radar beam. Computer 86 also receives the signals received by the shadow computer 84, namely $R(t)$ and $(h+a)$ as shown in FIG. 3. The height of the aircraft above the actual terrain is then computed as the difference between the altitude and terrain elevation, i.e. $h+a-e(t)$. The tangent of an angle $\alpha$ (see FIG. 1) extending upwardly to the aircraft from the line of sight is computed as the ratio between this difference quantity and the ground range, $$\frac{h+a-e(t)}{R(t)}$$

The elevation signal $e(t)$ may also be differentiated to obtain a further signal $$\frac{d}{dt}e(t)$$

representing the terrain slope at the incremental area being viewed and equal to the tangent of an angle $\beta$. The cosine of the angle of incidence $\Omega$ may be computed by analog methods from the tangent function of the angles $\alpha$ and $\beta$ to obtain a modified video signal wherein certain of the terrain features are exaggerated and others are defined in accordance with various of the viewing angles as normally observed by the pilot. Further details of an aspect angle computer are to be found in the hereinbefore referenced U.S. Patent No. 3,100,238.

The derived signals as modified by shadow computer 84 and aspect computer 86 are mixed and the resultant combined video provided thereby being coupled through comparator and switching circuit 36 to a pilot's display device 38. The invention contemplates the use of a conventional terrain avoidance radar display as device 38, since the converted stored elevation information may readily be displayed thereon. It is also contemplated by an alternate embodiment of the invention however, that display device 38 may provide a three-dimensional perspective view of the terrain, utilizing the apparatus described in copending application Serial No. 442,392, filed March 24, 1965, and assigned to the assignee of the present invention. It is felt that the additional equipment necessary to provide the three-dimensional display usually is not warranted, particularly in high performance military aircraft wherein space and weight are at a premium, since the majority of pilots are trained to fly low-level profile missions solely by the display provided by the active radar avoidance system. In either event, the display system contemplated by the invention allows the aircraft to be flown solely from internally-retrieved, stored data, without the use of detectable, radiated electromagnetic energy.

Figure 4:
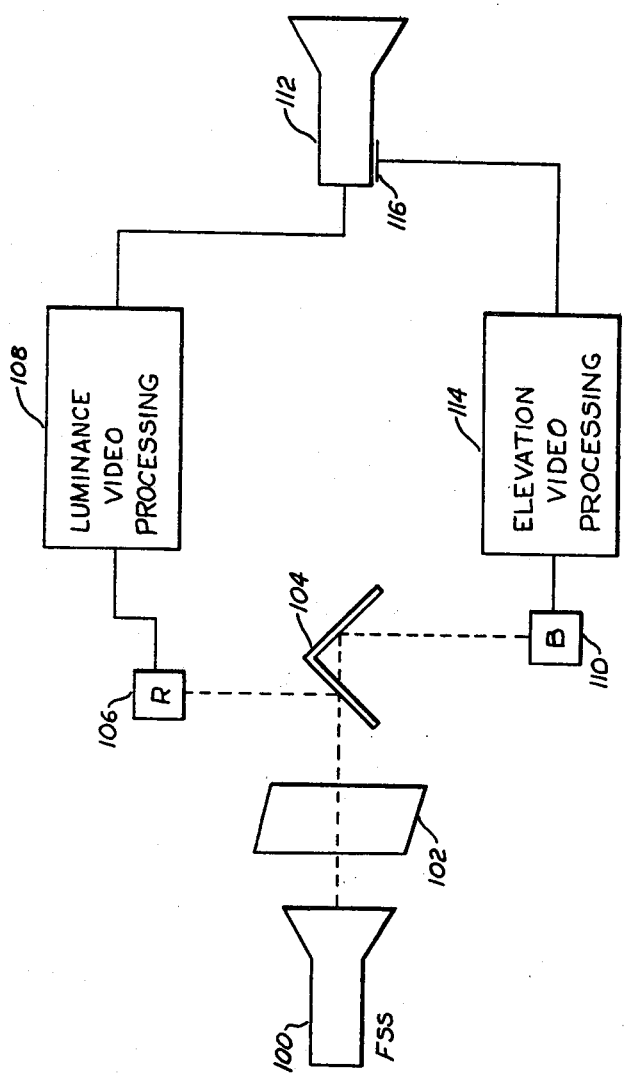
FIG. 4 is a block diagram of a system which provides a three-dimensional display.

With reference to FIG. 4, there is shown a system for providing a three-dimensional display of a terrain. A flying spot scanner 100 is positioned for scanning a single transparency 102 on which terrain or luminance data is encoded as graduations of one color and elevation data is encoded as graduations of another color. In FIG. 4, the transparency or film 102 is assumed to have luminance information encoded in shades of red and to have elevation information encoded in shades of blue. Consequently, the beam from the flying spot scanner 100 applied to the film 102 is modulated both in color and intensity in accordance with the data encoded on the film 102. The modulated beam is separated into the primary colors red and blue by a double dichroic mirror 104 wherein each surface of the mirror reflects the light of certain colors while passing other colors. The red reflected from dichroic mirror 54 is sensed by a photo-sensor 106 and is applied to the luminance video processing circuits 108. The blue reflected by mirror 104 is sensed by a photo-sensor 110 and applied to elevation video processing circuits 114.

An output of the luminance video processing circuits 108 is connected to the intensity grid circuits of a cathode ray tube 112 and an output of the elevation video processing circuits 114 is connected to the vertical deflection circuit, diagrammatically indicated by the plate designated with the reference numeral 116, of the cathode ray tube 112. The effect of elevation changes is provided in the invention when the luminance video information is reconstituted by varying the sweep speed of the cathode ray tube 112 employed to provide the display.

Generally, the low-level flight system of the invention employs the azimuth sweep and trigger commands from the existing aircraft radar system to drive a three inch flying-spot scanner tube, the transmitting portion of the radar being maintained inactive. The light beam generated by the flying-spot scanner may scan a 35 or 70 mm. conventional black-and-white film strip encoded with elevation data of the terrain to be overflown. The film strip width may contain elevation data for 100 miles on the 35 mm. film at a scale ratio of $5 \times 10^6:1$ or 200 miles on 70 mm. film at the same scale ratio. This lateral coverage may be seen to provide more than sufficient latitude for the normal low-level profile mission. Further, since a greater range is displayed to the pilot, the time required for the pilot to interpret the display may be reduced, since the terrain to be overflown during the next 10 or 15 minutes is presented to the pilot, rather than merely 1 or 2 minutes of flight time.

Initial calibration of the system is provided by matching the active system display with that computed from the film strip. Further, intermittent confidence checks may be performed, either manually or by an automatic system as discussed above, by turning an active system for short intervals. As indicated, this feature may be attained by utilizing the radar altimeter, which minimizes the possibility of detection of the aircraft by radiating electromagnetic energy only directly beneath the aircraft.

As stated above an important feature of the invention is the inclusion of novel circuitry for selectively calibrating accuracy of the stored data as displayed on radar display 90 for pilot confidence. This feature is obtained by intermittently energizing a conventional radar altimeter 40, the output of the altimeter providing one input to comparator 36. A second input to comparator 36 is provided by the computed elevational information $e(t)$. As is well known, altimeter 40 radiates in a narrow cone beneath the aircraft, and the intermittent use of such as altimeter does not markedly increase the possibility of the aircraft being detected. Should the difference in the computed elevational information $e(t)$ be in error by a predetermined number of feet from the aircraft altitude as measured by altimeter 40, the switching circuits within unit 36 operate to transfer the display from the computed elevational information to the then-energized radar terrain avoidance system 42.

Further, it may readily be seen that the low-level flight system of the present invention is obviously adaptable for use with any of the conventional bomb-navigational systems now employed in high-performance military aircraft, merely by substituting the signal corresponding to the retrieved pre-stored terrain elevational data for the signal normally provided by the aircraft's radar altimeter. The invention further contemplates the super-imposition of a pictorial representation of the aircraft, the target, and the bomb or missile release position upon the final display in accordance with the data furnished by the bomb-navigational computer system whether the display is of the usual radar type or of the improved three-dimensional type disclosed in Serial No. 442,392. Additionally, while the invention may supplement and be an aid in instrument landings of commercial and private aircraft, the use therein is of secondary importance only, since radiated electromagnetic energy presents no problem in such applications. It is strongly emphasized however, that whenever externally radiated electromagnetic energy must be minimized, that the apparatus and method of the present invention is of paramount importance.

Conversely, the invention contemplates the use of the system, of and by itself, to calibrate the radar altimeter by an interchange of their respective roles, whereby the altitude as measured by the altimeter is compared with the pre-stored data as a reference. Additionally, although a preferred embodiment of the invention has been described wherein the elevation information is stored on a photographic transparency, it will be understood by those skilled in the art that any of the well-known data storage techniques employed in data processing machines, such as magnetic cores, tapes, disks, and punched cards, or the like, may be substituted as desired.

What has been described is a novel essentially passive low-level flight system wherein terrain elevation data is stored within the aircraft and selectively retrieved and displayed to the pilot either in radar or three-dimensional perspective form under control of the aircraft inertial guidance system.

It will thus be seen that the objects set forth above, among those made apparent from the preceding description, are efficiently attained, and since certain changes may be made in the above constructions without departing from the scope of the invention, it is intended that all matter contained or shown in the accompanying drawings shall be interpreted as illustrative and not in a limiting sense.

The embodiments of the invention in which an exclusive property or privilege is claimed are defined as follows:

1. A low-level flight system for use within an aircraft having included therein an inertial navigation computer, comprising in combination,
    a terrain elevation data storage device, said data being prestored therein in accordance with the elevational contours of any of the terrain to be overflown by said aircraft;
    a data to video electronic signal converter;
    means coupling positional information generated by said inertial navigation computer to said data storage device to thereby selectively retrieve only data representative of the terrain to be immediately overflown by said aircraft;
    further means coupling said data representative of the terrain to be immediately overflown to said data to video electronic signal converter; and
    means responsive to said converted retrieved data provided by said data to video electronic signal converter for displaying to an operator of said aircraft terrain elevation information corresponding to the actual terrain to be immediately overflown.

2. The system of claim 1 wherein said last named means includes means for displaying said terrain elevation information upon a radar terrain avoidance system display device.

3. The system of claim 1 wherein said last named means includes means for displaying said terrain elevation information in three-dimensional perspective upon a video display device.

4. The system of claim 1 wherein said aircraft includes at least one radar altimeter and a radar terrain avoidance system,
    comparator and switching circuitry responsive to said data to video electronic signal converter, said radar altimeter, and said radar terrain avoidance system normally effective to maintain said radar terrain avoidance system in the quiescent state, and being further operable upon the occurrence of a predetermined difference in the elevation data as retrieved from said terrain elevation data storage device and as measured by said radar altimeter to inhibit the signal provided by said data to video electronic signal converter, to activate said normally quiescent radar terrain avoidance system, and to couple the output therefrom upon a video display device.

5. A low-level flight system operable to display to the pilot of a high-performance aircraft terrain elevational data without radiating electromagnetic energy external of the aircraft, comprising in combination,
    means for storing terrain elevational information within said aircraft, said information corresponding to a plurality of incremental portions of the terrain to be overflown;
    means responsive to the position of said aircraft with respect to a reference point operable to selectively retrieve elevational information relating to the height $h$ of the aircraft above the terrain along the line of sight of said aircraft;
    conversion means for converting said selectively retrieved elevational information into a video signal;
    a display device; and
    means coupling said video signal to said display device whereby said elevational information is presented to said pilot.

6. The system of claim 5 further including,
    means for measuring and determining the height $h$ of the aircraft above the terrain;
    means for comparing the value $h$ as retrieved from said means for storing and as determined by said means for measuring to provide an error signal proportional to the difference therebetween; and means responsive to said error signal operable to inhibit said coupling means when said error signal exceeds a predetermined minimum.

7. A passive low-level flight system operable to display to the pilot of an operational aircraft simulated terrain elevation features, comprising, in combination:

a photographic film transparency having encoded thereon in gray scale variations terrain elevation contours representative of the height above sea level of each incremental portion of the terrain located in the area over which the aircraft is to be flown;

a flying-spot-scanner and a photo-sensitive device;

means positioning said transparency intermediate said flying-spot-scanner and said photo-sensitive device whereby said gray scale variations modulate the light transmitted by said scanner incident upon said photo-sensitive device, said positioning means being responsive to the location of said aircraft to emplace successive specific regions of said transparency in the area scanned by said flying-spot-scanner;

first and second deflection circuits coupled to said flying-spot-scanner to deflect the light beam provided thereby across said successive specific regions of said transparency;

computer circuitry coupled to said photo-sensitive device to provide a modified video signal proportional to $h_1$, $R(t)$, and $e'(t)$ wherein $h_1$ is the height of the aircraft above the terrain as encoded upon said transparency, $R(t)$ is the linear range between the aircraft position and the terrain being viewed, and $e'(t)$ is the output of said photo-sensitive device as modulated by said gray scale variations encoded upon said transparency;

a pilot's display device having at least one input terminal;

a comparison and switching circuit interconnecting said modified video signal with said at least one input terminal normally operable to couple said modified video signal to said at least one input terminal;

radar means for deriving a signal $h_2$ corresponding to the actual height of the aircraft above the terrain; and said comparator and switching circuit being further operable to decouple said modified video signal from said at least one input terminal when the magnitudes of $h_1$ and $h_2$ differ by a predetermined amount.

8. The system of claim 7 including, a radar terrain avoidance system;

circuit means coupling the output of said radar terrain avoidance system to an input to said comparator and switching circuit; and said comparator and switching circuit additionally operable to normally maintain said radar terrain avoidance system inactive when the magnitudes of $h_1$ and $h_2$ differ by less than said predetermined amount and to render said radar terrain avoidance system active and couple the output therefrom to said pilot's display device when the magnitudes of $h_1$ and $h_2$ differ by more than said predetermined amount.

9. A low-level flight system for use within an aircraft having an inertial navigation computer, comprising, in combination:

a data storage device for carrying pre-stored terrain elevation data pertaining to the elevational contours of an area of terrain to be overflown by said aircraft;

means controlled by positional information generated by said inertial navigation computer to selectively retrieve from said storage device elevational data representative of terrain to be immediately overflown by said aircraft;

means for converting the data retrieved from said storage device to an electronic video signal;

and a display device responsive to said video signal for displaying to an operator of said aircraft a display simulating the elevation of terrain immediately to be overflown.

References Cited

UNITED STATES PATENTS 3,290,674   12/1966   Calhoon _____ 343—5

RODNEY D. BENNETT, *Primary Examiner.*

C. L. WHITHAM, *Assistant Examiner.*